(12) United States Patent
Alexander et al.

(10) Patent No.: US 8,328,263 B1
(45) Date of Patent: Dec. 11, 2012

(54) BED EXTENDER

(76) Inventors: David Alexander, Mayfield, KY (US); William Robert Clark, Paducah, KY (US)

( * ) Notice: Subject to any disclaimer, the term of this patent is extended or adjusted under 35 U.S.C. 154(b) by 0 days.

(21) Appl. No.: 13/172,821

(22) Filed: Jun. 29, 2011

(51) Int. Cl.
*B62D 39/00* (2006.01)

(52) U.S. Cl. .................. 296/26.09; 410/106; 410/97

(58) Field of Classification Search .......... 296/26.08, 296/26.09; 410/106, 97
See application file for complete search history.

(56) References Cited

U.S. PATENT DOCUMENTS

| | | | |
|---|---|---|---|
| 2,729,499 A * | 1/1956 | Eggum | 296/26.09 |
| 4,475,760 A * | 10/1984 | Morgan | 296/26.09 |
| 5,451,088 A * | 9/1995 | Broad | 296/26.08 |
| 5,456,511 A | 10/1995 | Webber | |
| 5,547,321 A * | 8/1996 | Thomas | 410/102 |
| 5,700,047 A | 12/1997 | Leitner et al. | |
| 5,752,800 A | 5/1998 | Brincks et al. | |
| 5,820,188 A | 10/1998 | Nash | |
| 5,823,597 A * | 10/1998 | Anderson | 296/26.08 |
| 5,924,753 A | 7/1999 | DiBassie | |
| 6,024,528 A * | 2/2000 | Taylor | 414/495 |
| 6,070,926 A | 6/2000 | Hardin | |
| 6,213,530 B1 | 4/2001 | Bohannon | |
| 6,378,926 B1 | 4/2002 | Renze et al. | |
| 6,540,123 B1 | 4/2003 | Kmita et al. | |
| 6,994,389 B1 | 2/2006 | Graffy et al. | |
| 7,063,366 B2 | 6/2006 | Leitner et al. | |
| 7,237,817 B2 * | 7/2007 | Kobylski et al. | 296/26.09 |
| 7,703,825 B2 | 4/2010 | Brown | |
| 7,770,956 B1 | 8/2010 | Summers | |

OTHER PUBLICATIONS

U.S. Appl. No. 09/681,526, filed Oct. 24, 2002, David John Brzenchek.

* cited by examiner

Primary Examiner — Joseph Pape

(57) ABSTRACT

A bed extender having tubular first and second elongated arm connected together by a bed cross-member. The elongated arms and bed cross-member include tabs or other features for mounting to the bed of a vehicle. The bed extender also includes a rear slide assembly having elongated first and second slide members that slide in the first and second elongated arm. A vertical support extends upward from the ends of the slide members. The bed extender further includes a lock mechanism for locking the rear slide assembly into place in the first and second elongated arms. The vertical support structure includes first and second corner braces attached to the slide members. Up-tubes extend vertically from the corner braces, and a support arm extends across the up-tubes. A lower cross-member connect the first and second corner braces. The bed extender further includes an attachment feature for attaching ropes or similar devices to retain cargo in place.

14 Claims, 5 Drawing Sheets

BED EXTENDER

FIELD OF THE INVENTION

The presently disclosed subject matter is directed towards a cargo extender for trucks and other vehicles having beds and which enables transportation of items that would otherwise be too long to be transported in a bed.

BACKGROUND OF THE INVENTION

One very commonly used vehicle is the pickup truck. Like other trucks a pickup truck is designed to carry cargo. To do so a pickup has a truck cab where a driver and passengers sit and a truck bed that is located behind the cab and which is used to carry cargo. Pickup trucks are so successful that every year they are among the best-selling vehicle models.

Pickups trucks come in many different sizes, from small 4-cylinder compacts having, short beds to diesel-powered full size vehicles having extended beds that can carry tons of cargo. However, no matter how big a truck is or how long a truck bed may be, there are some items that may be too long for the truck bed. For example, room sized carpets, wood planks, steel beams, some plumbing supplies, ladders; all can be too long for a pickup truck to safely carry. As a specific example some ladders are over twelve feet long while many truck beds are only six to eight feet long. If such a ladder is transported in a truck having a short bed much of the ladder would extend over the truck bed and would be unsupported, which may lead to damage to either the truck bed or the ladder.

Compounding the problem of short beds is that pickup trucks having shorter beds are very popular. They are easier to handle and more maneuverable than trucks with longer beds. But, trucks with longer beds can carry more than trucks with short beds. The foregoing problem is not limited to pickup trucks. Other vehicles, such as vans and SUVs have beds for moving cargo. But, sometimes an item needing to be moved is just too long for the vehicle's bed.

There are devices that attach to truck beds that enable more cargo to be carried. However, such devices either do not permit long items to be carried or if they do they are difficult to use and can prevent a truck's tailgate from closing. Therefore, a device that enables a truck or other vehicle to carry items longer than the vehicles bed and that is easy to use would be beneficial. Even more beneficial would be such a device that collapses to fit the length of the bed while extending to enable carrying of long items. Even more beneficial would be a device that fits in a vehicle's bed, that extends out to allow carrying of long items, that collapses back into the bed and out of the way, and that is easy to use. Still more beneficial would be a device that fits in a vehicle's bed, that extends out to allow carrying of long items, that collapses back into the bed after use, that is easy to use, and that can be made at low cost using readily available materials.

BRIEF SUMMARY OF THE INVENTION

The principles of the present invention provide for a device that fits in the bed of a truck or similar type vehicle, that extends out to allow carrying of long items, that collapses back into the bed after use, that is easy to use, and that can be made at low cost using readily available materials.

A bed extender in accordance with the principles of the present invention includes a tubular first elongated arm and a tubular second elongated arm that are connected together by a bed cross-member. The elongated arms and bed cross-member include tabs or other features suitable for attaching those members to the bed of a vehicle. The bed extender also includes a rear slide assembly having an elongated first slide member that slides in the first elongated arm and an elongated second slide member that slides in the second elongated arm. Attached to the first and second slide members is a vertical support structure. The bed extender further includes a lock feature for locking the rear slide assembly into place relative to the first and second elongated arms and an attachment feature for receiving rope or other tie-downs to retain cargo in the bed.

The vertical support structure beneficially includes first and second corner braces that attach to the first and second slide members. Up-tubes extend vertically from the corner braces and a support arm extends across the up-tubes. A lower cross-member also extends between the first and second corner braces.

BRIEF DESCRIPTION OF THE DRAWINGS

The advantages and features of the present invention will become better understood with reference to the following detailed description and claims when taken in conjunction with the accompanying drawings, in which like elements are identified with like symbols, and in which:

DETAILED DESCRIPTION OF THE INVENTION

The presently disclosed subject matter now will be described more fully hereinafter with reference to the accompanying drawings in which one particular embodiment is shown. However, it should be understood that this invention may take many different forms and thus this invention should not be construed as being limited to the embodiment set forth herein. In the figures like numbers refer to like elements throughout.

Figure 1:
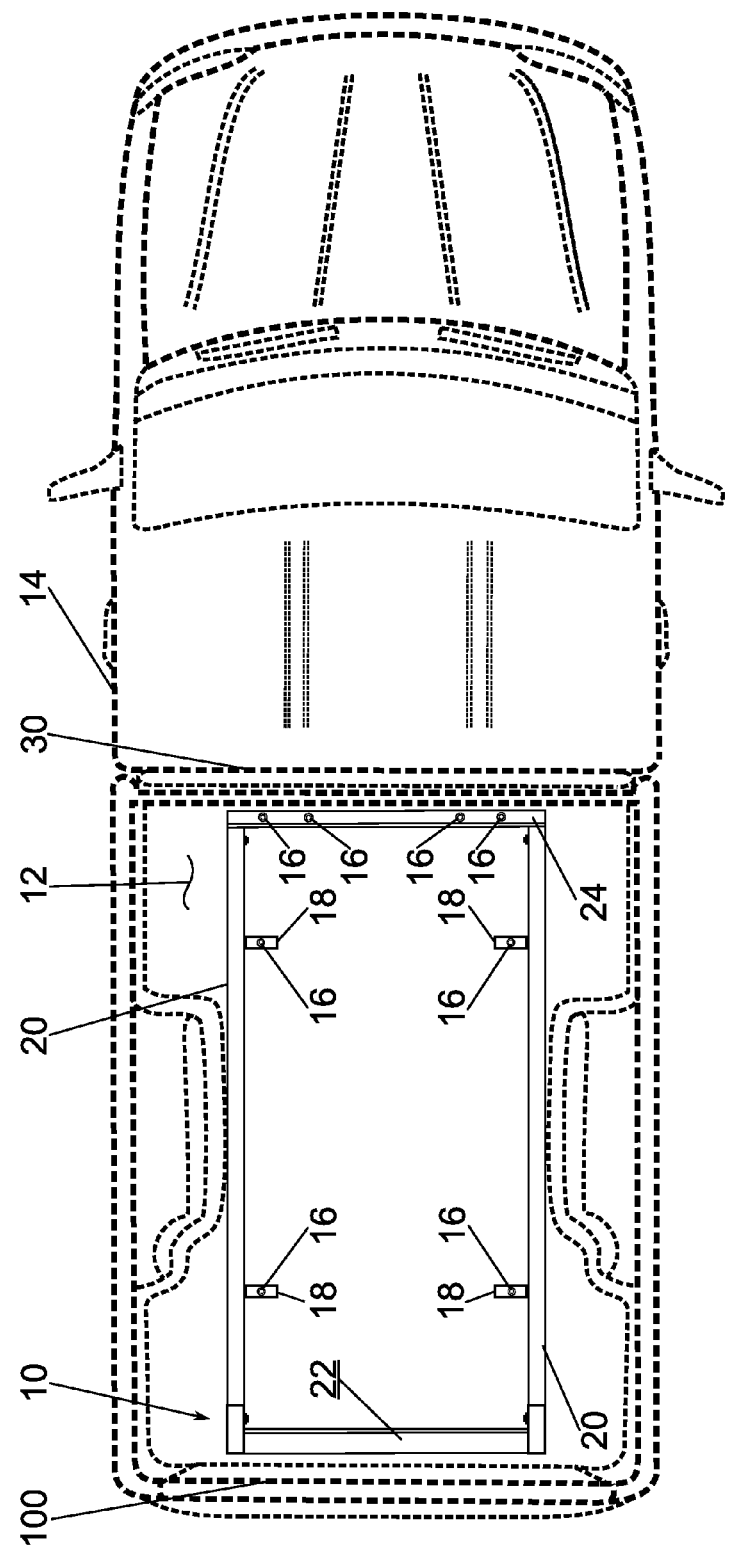
FIG. 1 is a top down view of a bed extender that is in accord with the principles of the present invention and which is mounted in a bed of a pickup truck.

Referring now to FIG. 1, the principles of the present invention provide for a bed extender 10 that is easily stowed in a bed 12 of a pickup truck 14. Although FIG. 1 illustrates a pickup truck 14 the present invention is not limited to being used only in such vehicles. In fact, the principles of the present invention are fully applicable with other cargo-carrying vehicles such as vans and SUVs.

Refer to FIGS. 1-4 as required in the discussion that follows, the bed extender 10 is bolted to the bed 12 using four bolts 16. Those bolts 16 pass through tabs 18 that extend from and are rigidly attached to elongated arms 20 that run along the length of the bed 12. The elongated arms 20 are spanned by a rear slide assembly 22 (described in more detail subsequently) and a front "L" shaped angle iron cross-member 24.

The cross-member 24 is also attached to the truck bed using bolts 16 that pass through the cross-member 24.

The bed extender 10 takes a generally rectangular shape that is longer along the length of the bed 12 than along its width. The cross-member 24 is bolted to the bed 12 close to the rear of the cab 30 (see FIG. 1), while the rear slide assembly 22 can be collapsed so as to be located in front of a tailgate 100 of the truck 14. The rear slide assembly 22 is however movable as is shown and described subsequently.

Figure 2:
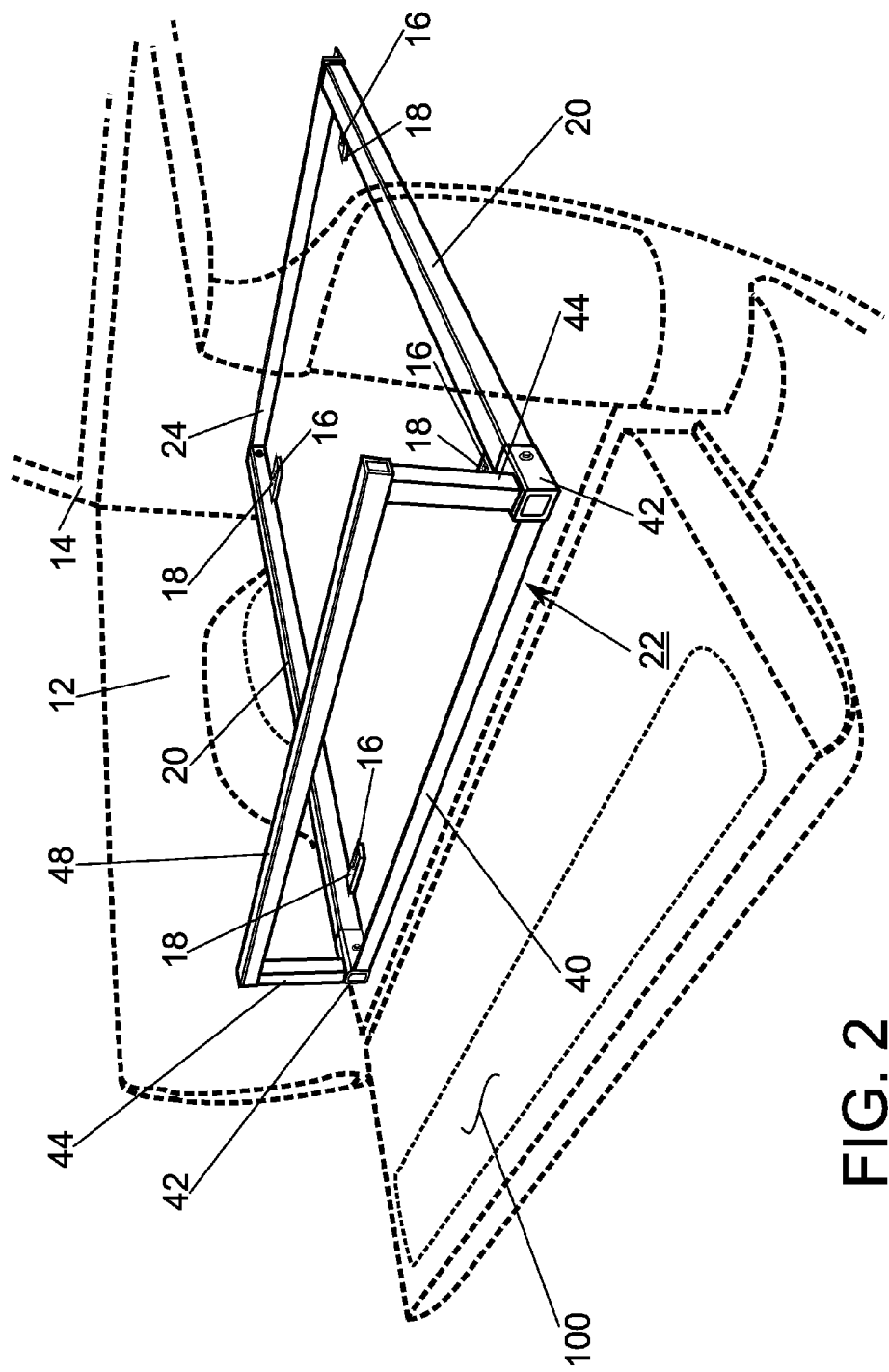
FIG. 2 is a side perspective view of the bed extender and pickup truck illustrated in FIG. 1 wherein the truck's tailgate is down and wherein the bed extender is in a stowed position.
Figure 5:
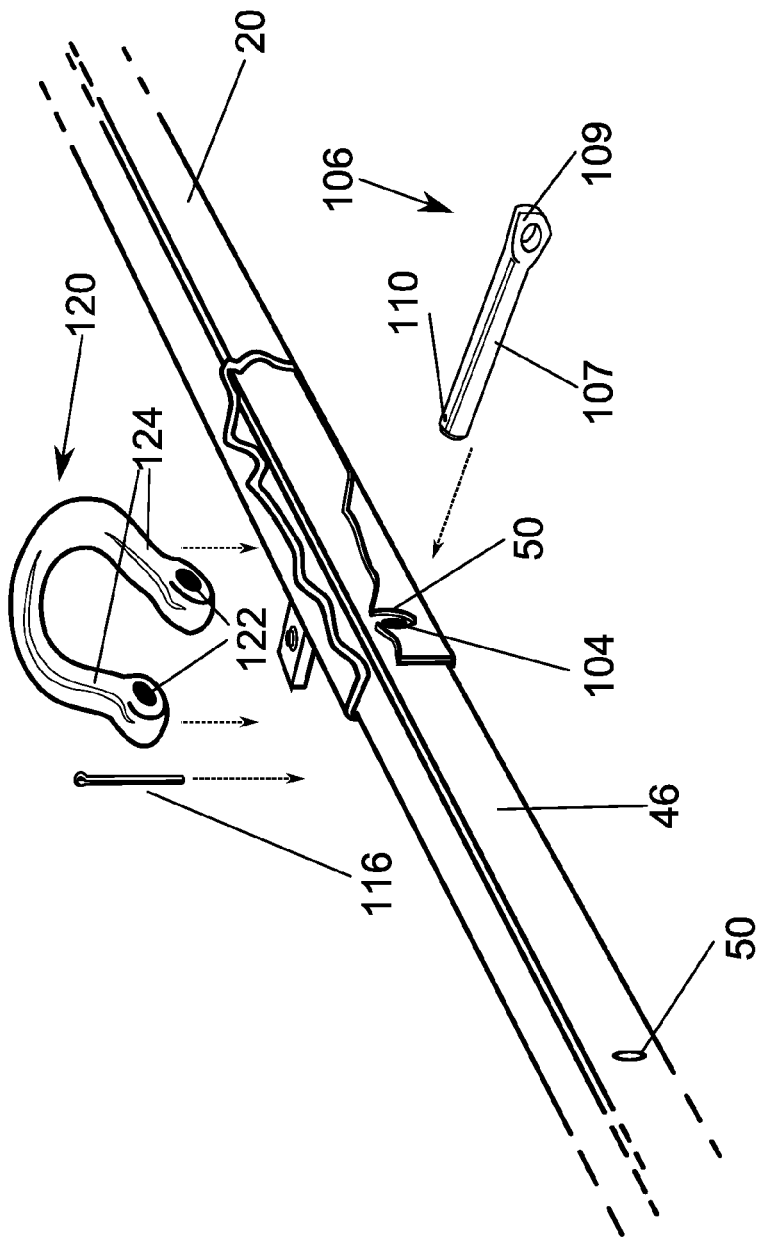
FIG. 5 is a partial exploded view of a portion of the bed extender showing part of an extended arm, part of a slide tube and locking hardware used to lock that extended arm and slide tube together.

Referring now to FIGS. 2 and 5 as required, the elongated arms 20 run parallel to each other and are beneficially comprised of square (or rectangular) tubes. Those tubes are beneficially made from strong, rigid material such as steel, stainless steel, aluminum, or a strong thermoplastic. The tabs 18 and the "L" shaped angle iron cross-member 24 are also beneficially comprised of the same material as the elongated arms 20. However, the "L" shaped angle iron cross-member 24 includes a plurality of apertures through which the bolts 16 pass into the bed 12, while the tabs 18 each include one aperture (best shown in FIG. 1). The cross-member 24, tabs 18, and the elongated arms 20 are beneficially welded together. However, other forms of joining, such as bolts, rivets, or chemical welding (if thermoplastic materials are used) are also suitable.

From the foregoing it is apparent that the tabs 18, elongated arms 20, and cross-member 24 form a strong, solid bed mount that can be rigidly attached to the bed 12.

Figure 3:
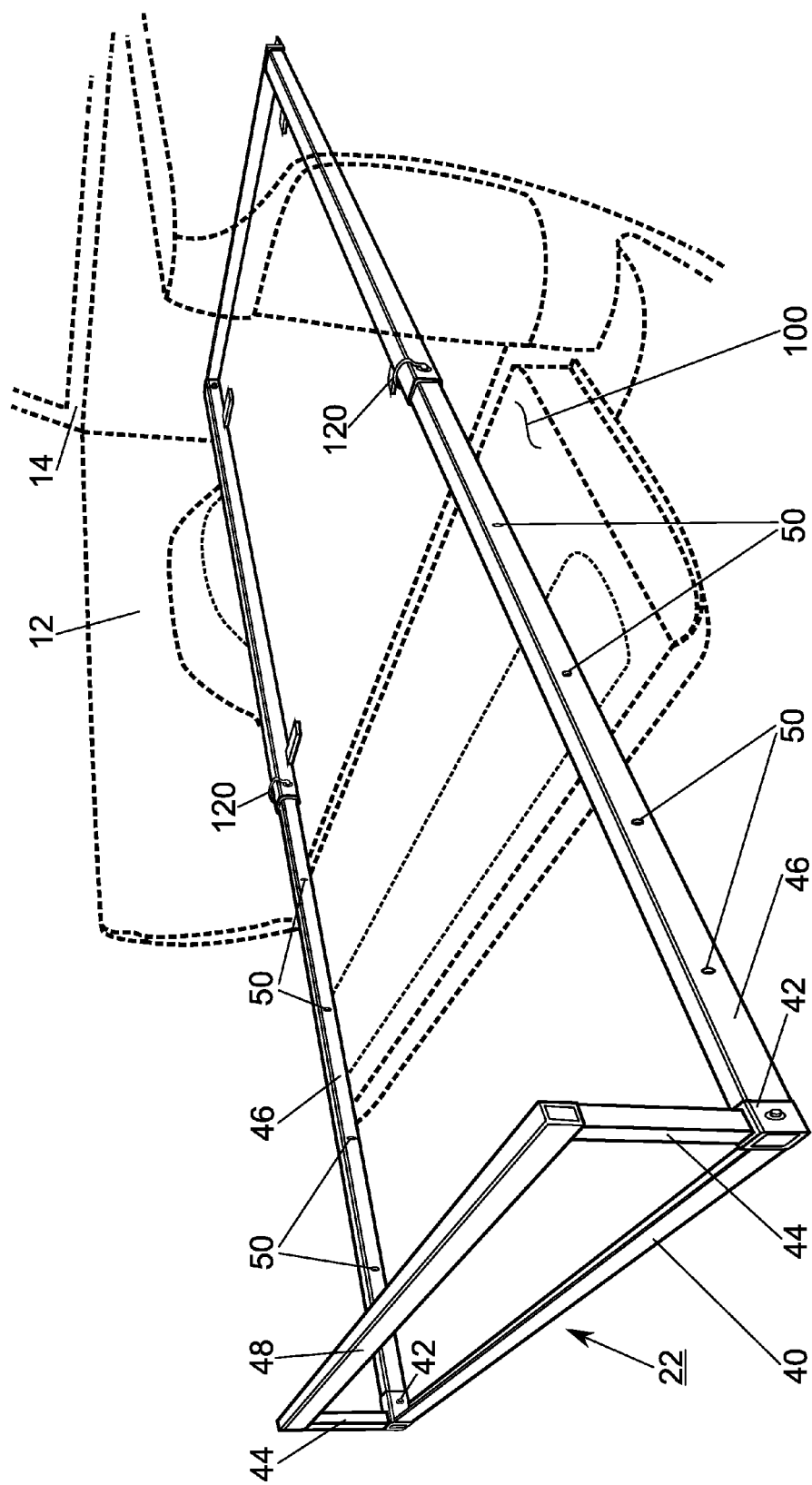
FIG. 3 is a side perspective view of the bed extender and pickup truck illustrated in FIGS. 1 and 2 wherein the truck's tailgate is down and wherein the bed extender is in an extended position.
Figure 4:
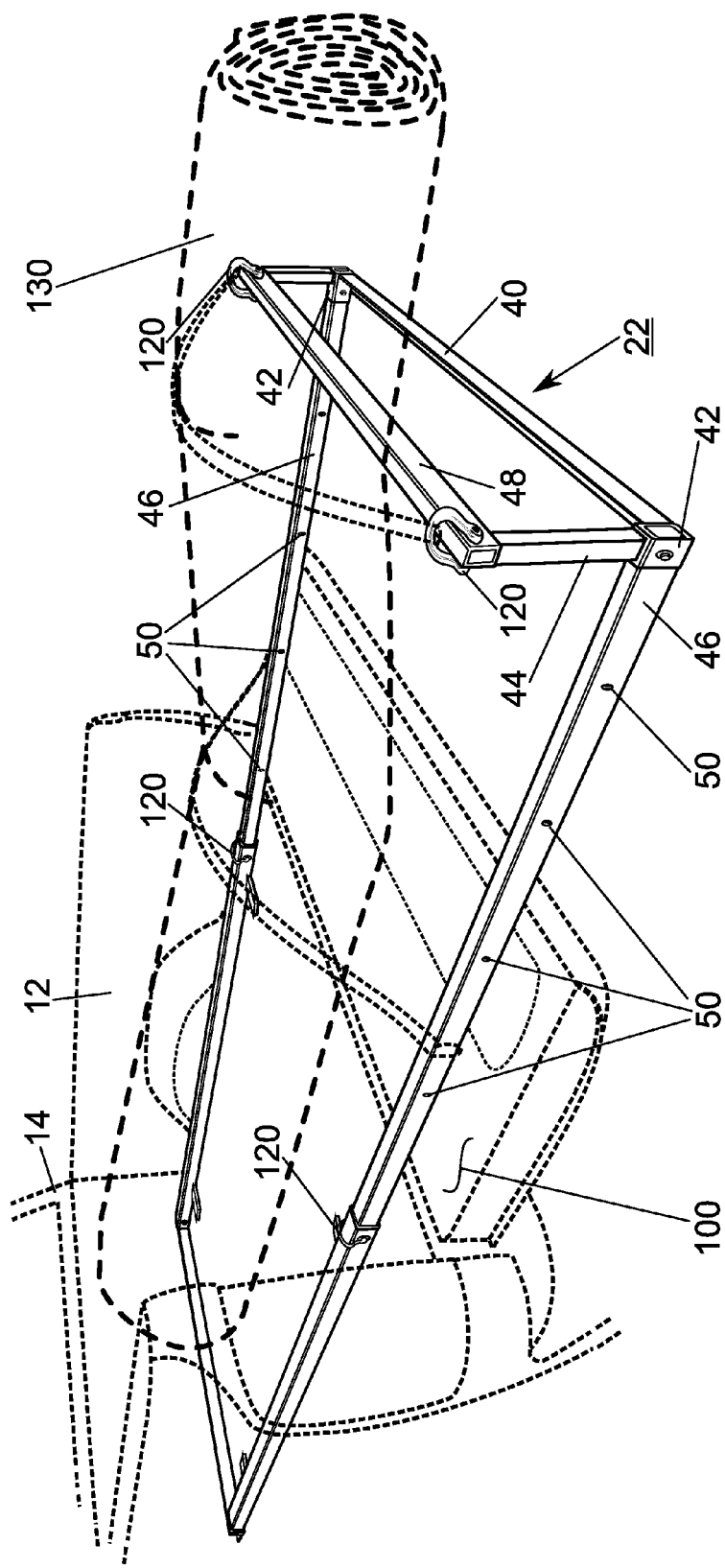
FIG. 4 is a side perspective view of the bed extender and pickup truck illustrated in FIG. 3 carrying a roll of carpet.

Turning now to FIGS. 2 through 4 as required, the rear slide assembly 22 includes a cross-member 40 that attaches to corner braces 42 that are located at each end. Each corner brace 42 also connects to a generally vertically orientated up tube 44 and to a generally horizontally orientated slide tube 46. Thus there are two vertical up tubes 44 and two horizontal slide tubes 46. Across the top of each vertical up tube 44 is a horizontally orientated support arm 48. The cross-member 40, the two corner braces 42, the two up tubes 44, and the support arm 48 form a strong, solid, and substantially rigid rectangular structure that runs substantially perpendicular to the elongated arms 20.

Still referring to FIGS. 2-4 as required, the cross-member 40 is beneficially comprised of an "L" shaped piece of angle iron, while the two vertical up tubes 44, two horizontal slide tubes 46, and the support arm 48 are beneficially comprised of square (or rectangular) tubes. The corner braces 42 may be configured to have integral upright tubes that fit into the vertical up tubes 44 and integral horizontal tubes that fit into the horizontal slide tubes 46. In any event the cross-member 40, the vertical up tubes 44, the horizontal slide tubes 46, the corner braces 42, and the support arm 49 are solidly joined such as by welding, brazing, soldering, mechanical fasteners, or by chemical welding. Those members are also beneficially comprised of the same material as the elongated arms 20, tabs 18, and cross-member 24.

Referring now to FIG. 5, but also to FIGS. 1-4 if required to understand the bed extender 10, the horizontal slide tubes 46 are elongated and dimensioned to fit with little free play into longitudinal apertures of the elongated arms 20. This allows the rear cross-member assembly 22 to slide along the elongated arms 20 to take the configurations illustrated in FIGS. 1-4. Each slide tube 46 includes a plurality of horizontal apertures 50 that pass through its side walls. Those apertures 50 are configured to align with apertures 104 that pass through the walls of the elongated arms 20 as the rear cross-member assembly 22 is slid along the elongated arms 20. This allows a pin 106 to pass though an aperture 50 and the aperture 104 so as to attach the rear cross-member assembly 22 to the remainder of the bed extender 10.

As there are two elongated arms 20 and slide tubes 46 (one on each side of the bed 12) there are two pins 106. Each pin 106 has a body 107 that can partially slide through the apertures 50 and 104 such that an aperture 110 through the body 107 is located outside of the elongated arm 20 while an expanded end 109 of the pin 106 extends from the other side of the elongated arm 20. The expanded end 109 is configured such that it cannot pass through the aperture 104. The aperture 110 allows a lock pin 116 to pass through the end of the pin 106.

Still referring primarily to FIG. 5, as the apertures 50 align with the apertures 104 the pins 106 can be are inserted through the elongated arms 20 and the slide tubes 46. When a lock pin 116 is inserted through the aperture 110 and bent, the rear cross-member assembly 22 is securely attached to the remainder of the bed extender 10, and to the bed 12 of the truck 14.

Referring once again to FIG. 5, in some applications it may be beneficial to attach a "U" bracket 120 to the bed extender 10. To do so the "U" bracket 120 includes apertures 122 that pass through the arms 124 of the "U" bracket 120. Then, before the pins 106 are inserted through the apertures 50 and 104 the apertures 122 are aligned with those apertures. The pins 106 are then inserted through the elongated arms 20, the slide tubes 46, and "U" brackets 120. The lock pins 116 are then inserted and bent as described above. The U" brackets 120 provide very convenient attachment points for chains, ropes, tie downs, stretch cables and other attachment mechanisms.

The foregoing has referred to using "U" brackets 120 only where the apertures 50 and 104 align. However, this is not required. "U" brackets 120 can be added at any of the apertures 50 by using other pins 106. This provides variable attachment locations on the bed extender 10.

FIG. 4 illustrates the truck 14 using the bed extender 10 to carry a long carpet 130 in the bed 12 of the truck 14. The rear cross-member assembly 22 is slide out of the elongated arms 20 to take a suitable length and then locked in place at the required extension using the pins 106 as described above. The carpet 130 is placed along the bed 12 and over the support arm 48. The carpet is then attached to the bed extender 10 and truck 14 using tie-downs and if appropriate one or more "U" brackets 120.

It is to be understood that while the figures and the above description illustrate the present invention, they are exemplary only. They are not intended to be exhaustive or to limit the invention to the precise forms disclosed, and obviously many modifications and variations are possible in light of the above teaching. Others who are skilled in the applicable arts will recognize numerous modifications and adaptations of the illustrated embodiments that remain within the principles of the present invention. Therefore, the present invention is to be limited only by the appended claims.

What is claimed:
1. A bed extender, comprising:
   a tubular first elongated arm having a rigidly attached first tab with a first aperture for receiving a first bolt to attach said first elongated arm to a vehicle bed;
   a tubular second elongated arm having a rigidly attached second tab with a second aperture for receiving a second bolt to attach said second elongated arm to the vehicle bed;
   a bed cross-member rigidly connecting said first elongated arm to said second elongated arm and having a third aperture for receiving a third bolt to attach said cross-member to the vehicle bed;

an elongated first slide member slidably inserted into said first elongated arm;

an elongated second slide member slidably inserted into said second elongated arm;

a vertical support structure attached to said first slide member and to said second slide member; and means for locking said first slide member to said first elongated arm.

2. A bed extender according to claim 1, wherein said vertical support structure comprises:

a first corner brace attached to said first slide member;

a second corner brace attached to said first slide member;

a first up tube extending from said first corner brace;

a second up tube extending from said second corner brace; and a support arm extending from said first up tube to said second up tube.

3. A bed extender according to claim 2, wherein said vertical support structure further includes a vertical support cross-member extending from said first corner brace to said second corner brace.

4. A bed extender according to claim 1, wherein said first tab is welded to said first elongated arm.

5. A bed extender according to claim 4, wherein said cross-member is welded to said first elongated arm.

6. A bed extender according to claim 1, wherein said cross-member is an "L" shaped angle iron having a flat lower plate.

7. A bed extender according to claim 1, wherein said first elongated arm includes a first pin aperture, said first slide member includes a second pin aperture, and said locking means includes a pin for passing through said first pin aperture and said second pin aperture.

8. A bed extender according to claim 1, wherein said first elongated arm includes an arm pin aperture, said first slide member includes a plurality of slide pin apertures, and said locking means includes a pin for passing through said first pin aperture and a selected slide pin aperture of said plurality of slide pin apertures.

9. A bed extender according to claim 1, further including a "U" shaped bracket attached to the first elongated arm for retaining cargo in place.

10. A bed extender according to claim 9, further including an attachment pin for attaching said "U" shaped bracket to said first elongated arm.

11. A bed extender, comprising:

a tubular first elongated arm having a rigidly attached external first tab for receiving a first bolt for mounting said first elongated arm to a truck bed, said first elongated arm having a first aperture that passes through said first elongated arm in a direction perpendicular to its elongation;

a tubular second elongated arm having a rigidly attached external second tab for receiving a second bolt for mounting said second elongated arm to the truck bed, said second elongated arm having a second aperture that passes through said second elongated arm in a direction perpendicular to its elongation;

a cross-member rigidly connecting said second elongated arm to said first elongated arm, said cross-member including an aperture for receiving a bolt that mounts said cross-member to the truck bed;

a rear slide assembly having a slide cross-member, a first corner brace connected to one end of said slide cross-member, a second corner brace connected to a second end of said slide cross member, an elongated first slide tube attached to said first corner brace and dimensioned to slide within said first elongated arm, an elongated second slide tube attached to said second corner brace and dimensioned to slide within said second elongated arm, wherein said first slide tube includes a first slide aperture that passes through said first slide tube in a direction perpendicular to its elongation, and wherein said second slide tube includes a second slide aperture that passes through said second slide tube in a direction perpendicular to its elongation;

a first elongated pin having a body with a first pin aperture near one end and a first expansion near the other, said first elongated pin dimensioned such that said first elongated pin can pass through said first aperture and said first slide aperture such that said first pin aperture and said first expansion extend from opposite sides of said first elongated arm and such that said first expansion cannot pass through said first aperture; and a second elongated pin having a body with a second pin aperture near one end and a second expansion near the other, said second elongated pin dimensioned such that said second elongated pin can pass through said second aperture and said second slide aperture such that said second pin aperture and said second expansion extend from opposite sides of said second elongated arm and such that said second expansion cannot pass through said second aperture.

12. A bed extender according to claim 11, wherein said rear slide assembly further includes a first up tube extending vertically from said first corner brace, a second up tube extending vertically from said second corner brace, and a support arm extending between said first up tube and said second up tube.

13. A bed extender according to claim 11, further including a "U" shaped bracket attached to said bed extender with a pin.

14. A bed extender according to claim 11, wherein said cross-member is an "L" shaped angle iron having a flat lower plate.

* * * * *